(No Model.)   3 Sheets—Sheet 1.

G. BEEKMAN.
MOWING MACHINE.

No. 526,018.   Patented Sept. 18, 1894.

WITNESSES:
Frank S. Ober
Eugene Lucas

INVENTOR
Gerard Beekman
BY
Henry F. Parker
ATTORNEY (No Model.) 3 Sheets—Sheet 2.
G. BEEKMAN.
MOWING MACHINE.
No. 526,018. Patented Sept. 18, 1894.
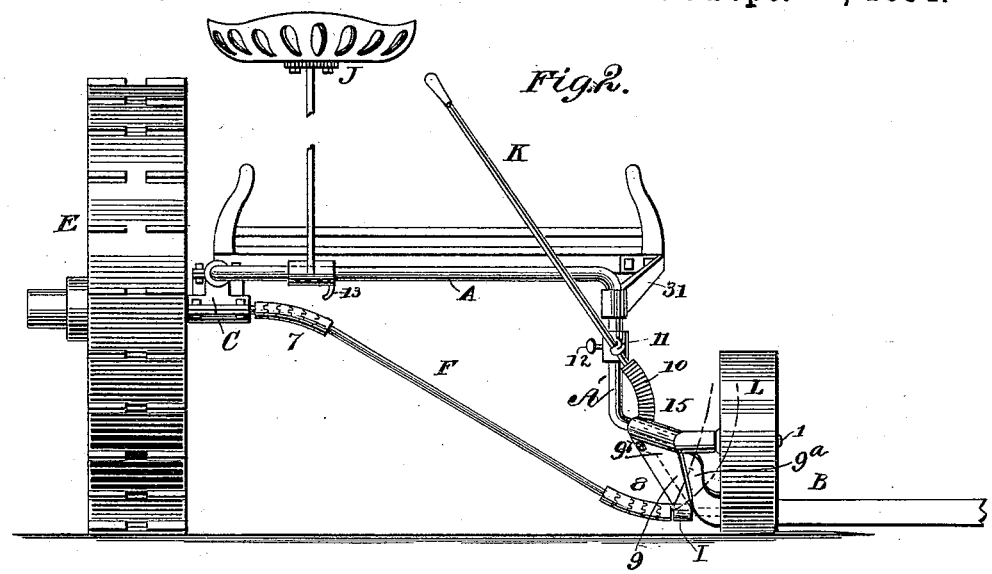
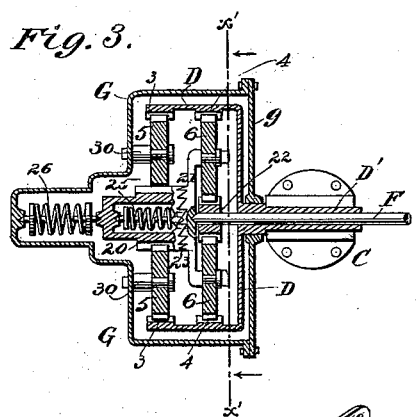
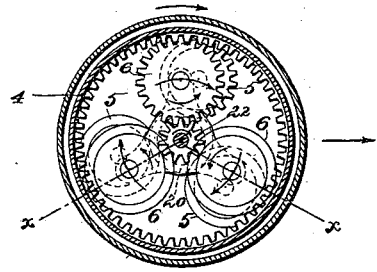
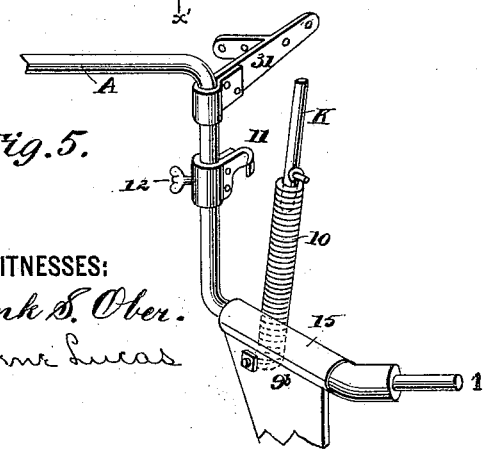
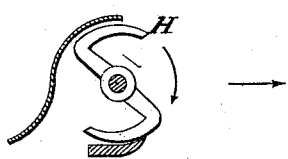
WITNESSES:
Frank S. Ober.
Eugene Lucas
INVENTOR
Gerard Beekman.
BY
Henry F. Parker.
ATTORNEY (No Model.) 3 Sheets—Sheet 3.

G. BEEKMAN.
MOWING MACHINE.

No. 526,018. Patented Sept. 18, 1894.

WITNESSES:
Frank S. Ober
Eugene Lucas

INVENTOR
Gerard Beekman.
BY
Henry F. Parker
ATTORNEY

UNITED STATES PATENT OFFICE.

GERARD BEEKMAN, OF NEW YORK, N. Y.

MOWING-MACHINE.

SPECIFICATION forming part of Letters Patent No. 526,018, dated September 18, 1894.

Application filed July 29, 1892. Renewed February 21, 1894. Serial No. 501,055. (No model.)

*To all whom it may concern:*

Be it known that I, GERARD BEEKMAN, a citizen of the United States, residing in the city, county, and State of New York, have invented certain new and useful Improvements in Mowing-Machines, of which the following is a specification.

My invention is more particularly designed for horse power mowing machines having rotary cutters, but is applicable in some of its features to reciprocatory cutters as well; and the said invention consists in an improved means of trunnioning the cutter supporting bar to the frame of the machine to render it adjustable with reference to the ground and capable of elevation therefrom for storage, without complexity of parts; also an improved lifting lever for the cutter supporting bar and means for counter-balancing said bar; also a novel construction of carriage for the machine; and also a novel mechanism for transmitting motion from the traction wheel to the cutter, and for automatically throwing the cutter out of gear when the machine is backed or the cutter supporting bar raised to an inactive position.

Figure 1:
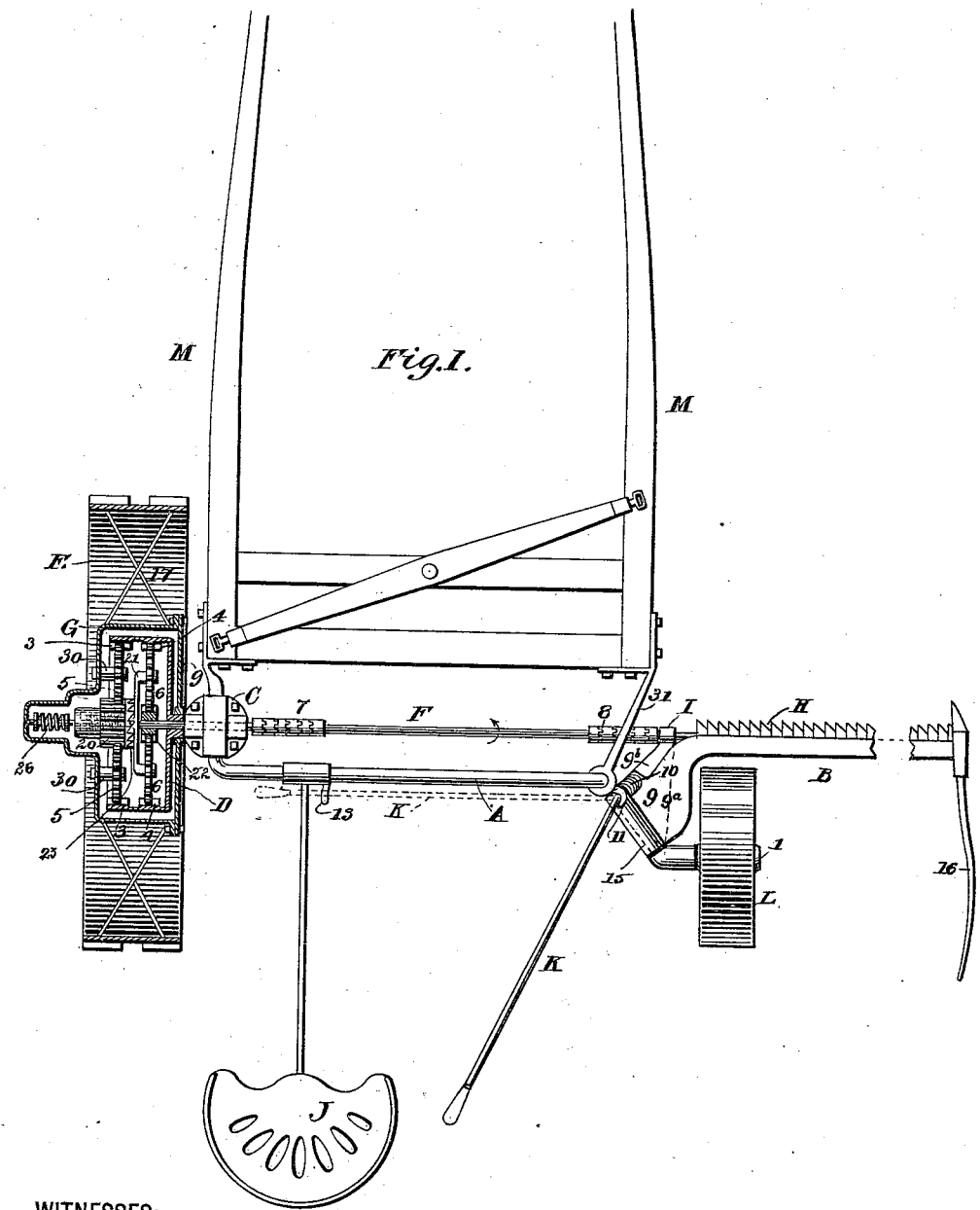
Figure 7:
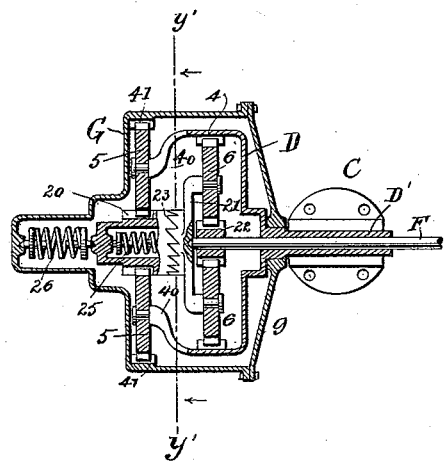
Figure 8:
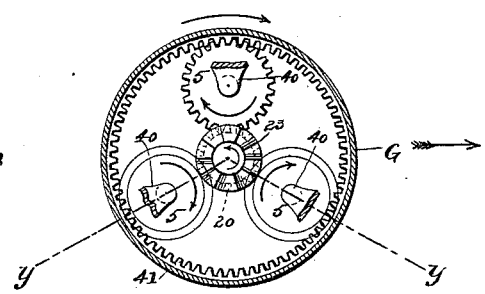

Referring to the accompanying drawings, in which similar characters of reference indicate corresponding parts throughout the several views:—Figure 1, is a general plan view of the machine partly in section; Fig. 2, a rear elevation of Fig. 1; Fig. 3, an enlarged detail view showing the transmitting gearing in horizontal section on the line $x$, $x$, Fig. 4; Fig. 4, a sectional elevation of Fig. 3, on the line $x'$—$x'$; Fig. 5, a perspective view showing certain details of the lifting device; and Fig. 6 a cross-sectional view of the cutter supporting bar and cutter. Fig. 7, is an enlarged detail view showing the modified construction of the transmitting gearing in horizontal section on the line $y$, $y$, of Fig. 8; Fig. 8, a sectional elevation of Fig. 7, on the line $y'$—$y'$; and Fig. 9 a cross sectional view of the cutter supporting bar and cutter modified in form, adapted for connection to the gearing shown in Figs. 7 and 8. Fig. 10 is a detail view showing a modification adapted for adjusting the height of the cutter above the ground; and Fig. 11 a perspective detail view of a part of Fig. 10.

The cross-bar A, is forged into suitable shape to compose the entire frame of the machine. To the trailing end 1, of the bar A, is trunnioned the cutter supporting bar B, and on the opposite end of the bar A, by means or a suitable cross-box C, is mounted a stationary hollow axle D', having at its outer end an internally toothed gear wheel provided with two series of teeth 3 and 4, throughout its circumference. The traction wheel E, of the machine is supported by its hub G, through the agency of the interposed gearing 5, 5, within the hub, and by the collar $g$, which fits the axle D'.

M, is the draft device to which the bar A is attached by its extremity projecting through the box C, and by the bracket 31.

The rotary shaft F, for driving the cutter H, is journaled in the box C, and bearing I, on the cutter supporting bar B. Such shaft is flexibly jointed at 7 and 8, by means of a sectional construction of shafting.

Rotary cutters H, suitable to the present machine are described and claimed in my Patents Nos. 490,781 and 490,782, both of January 31, 1893.

The seat J, is supported upon the cross-bar A, as indicated, and the latter forms a foot-rest.

The lifting lever K, is connected to the plate 9ª, of the cutter-supporting bar B, through the medium of a spiral spring 10, of sufficient resistance to lateral flexure to counter-balance the weight of the bar B, when the lever K, is retained. When the cutter-supporting bar B, is lowered near the ground the lever K, is permitted to rest in the hook 11, affording support for the cutter-supporting bar. The acting length and consequent counter-balancing power of the spring 10, may be regulated as required by the vertical adjustment of the hook 11, by the set screw 12, Fig. 5.

The cutter-supporting bar B, is trunnioned to the trailing end 1, of the frame bar A, at an angle oblique to the longitudinal axis of the machine, whereby such cutter supporting bar, when raised, sweeps through an arc approaching the center of the machine. The elevated position of the cutter supporting bar B, is limited by a suitable stop—such as that afforded by the back of the hook 11—and secured when raised by engaging the lever K, beneath the hook 13, as indicated by dotted lines in Fig. 1. The spring 10, admits of a universal yielding movement of the lever K, for this purpose.

The hilt 9 of the cutter supporting bar is composed of two superimposed plates 9$^a$, 9$^b$ bolted together; the same composing the upper and lower halves of the trunnion collar 15. Of these the upper plate 9$^a$ carries with it the cutter-supporting bar B, and the lower plate 9$^b$ carries the bearing I for the shaft F.

The side of the machine opposite to the traction wheel E, is supported by the traveling wheel L, and the outer extremity of the cutter supporting bar B, rests to the extent of its preponderance, on the divider 16, or other suitable or usual device.

Referring more especially to Figs. 1, 3 and 4, the rim E, of the traction wheel, is attached to the hub G, by means of wire or other spokes 17, adapted to afford rotative rigidity of the one part with reference to the other. The gearing in Figs. 1, 3 and 4, is adapted to rotate the cutter H with a downward cut on the side thereof advancing toward the grain, as represented in Fig. 6.

The planet gears 5, are mounted on studs 30, projecting within the hub G, which carry said gears therefore in an orbit. The circular rack 3, with which the gears 5, engage, being stationary, the said gears are retarded at the outer sides of their peripheries and their inner sides engaging with the pinion 20, rotate the latter at a greater speed than the rotative speed of the wheel E. The spider 21, is carried in rotation by the pinion 20, and bears a second series of planet gear wheels 6, also engaging with a stationary circular rack 4, at the outer sides of their peripheries. The inner sides of the gear wheels 6 engage with the pinion 22, which is attached to the cutter shaft F, revolving the latter with a further increase of speed as required for the cutters H. The directions of rotation of the several parts are indicated by arrows in Fig. 4. A clutch 23, is interposed between the pinion 20, and the spider 21, consisting of interlocking ratchet teeth which are held in engagement by the inward pressure of the shaft F, which is longitudinally movable in the box C, and bears in a step bearing in the spider 21. The teeth of the pinion 22, 20, are elongated to permit longitudinal motion. A spring 25, is interposed between the spider 21, and the pinion 20, in the hollow hub of said pinion, and a second spring 26 is interposed between the pinion 20, and the end of the hollow hub G. Each spring is centered in pointed bearings to permit the free rotation of the parts with reference to one another. The shaft F, of the cutter, is pushed toward the springs 25, 26, compressing the clutch 23 together, by the pressure of the bearing I in the shoulder of the flexible couplings 7 and 8, when the cutter bar B, is lowered; and when such cutter supporting bar is raised about its trunnion, the bearing I, retires by its sweep about the axis of the trunnion, and the shaft F, is released and pushed out by the springs 25, 26, until the clutch becomes separated, discontinuing transmission of rotation. The springs 25, 26, are adapted for limited expansion, which is so limited that the separation of the clutch may be permitted when the shaft F is retired; that is to say, the spring 26 takes up only one-half of the retiring motion of the shaft F, and the spring 25 the other half so that the pinion 20, is advanced only one-half as much as the spider 21, when the shaft F is retired; the clutch teeth 23 being thus disengaged. The spider 21 may advance nearly to the plate D—any further retraction of the shaft F being permitted by the sliding of the pinion 22 on the wheels 6, 6, 6. The spring 26, is also designed to take up the advancing motion of the shaft F, after the clutch has closed, when the cutter-supporting bar is lowered, and affords an elastic seat for said shaft. By reason of the inclined position of the clutch teeth 23, the same will disengage automatically against the spring 26, when the machine is backed.

It is to be observed that the arc through which the bearing I is carried by the cutter-supporting bar B when raised, is of much shorter radius than the arc through which the extremity 8 of the shaft F is carried about the fulcrum in the flexible coupling 7, and that the parts are intended to be so proportioned that when the rising motion of the cutter supporting bar B occurs, the necessary retirement of the said bearing I, shall be effected in the line of the shaft F, from the point 7, causing the clutch to separate as described, and to remain so separated when the said rising motion of the cutter supporting bar B has been completed.

Figure 9:
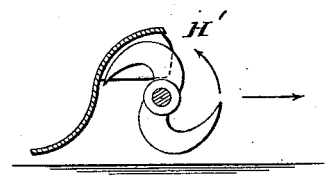
Figure 10:
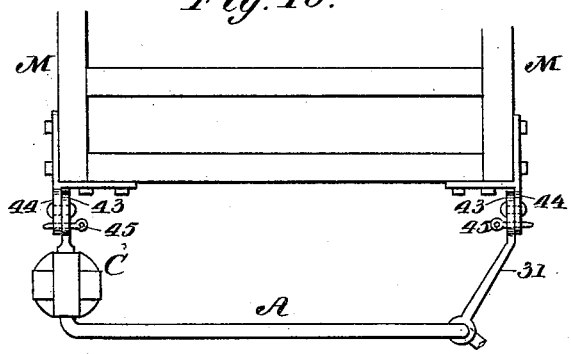

The gearing illustrated in Fig. 7 and 8, is adapted to rotate the cutter H' with an up cut on the side thereof advancing toward the grain, as represented in Fig. 9.

Figure 11:
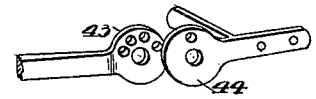

The gearing in Figs. 7 and 8, is similar in all substantial respects to the gearing hereinbefore described with reference to Fig. 1, 3, and 4, excepting that the pinions 5 are connected to the extensions 40 of the gear wheel D, in lieu of being connected to stud 30 of the traction wheel hub G; and the series 3 of teeth in said gear D are omitted and a series 41 within the said hub G substituted therefor. The axes of the pinions 5 thereby remain in a stationary position and the said pinions operate functionally as transmitting wheels imparting the same surface speed to the central pinion 20, as that of the series of gear teeth 41, in the hub G of the traction wheel. Rotation then occurs in the direction of the arrows seen in Fig. 8, causing the shaft F to rotate the cutter with an upward cut as aforesaid. Means are provided for elevating or lowering the cutter supporting bar B, so as to determine the height of cutting above the ground for a short or a long stubble; and said means are herein illustrated as a modification in Figs. 10 and 11. The adjustment is accomplished by varying the vertical angular position of the entire machine upon the axes of the wheels E and L, with reference to the draft device M. To this end coupling disks 43, 44, are provided, by which the connection between the carriage and the draft device is secured at an angle. The said disks are pivoted together; the one provided with a single hole, and the other with a series of holes as indicated in Fig. 11, through which a pin 45 is inserted to retain the adjustment desired.

Having thus fully described my invention, what I claim, and desire to secure by Letters Patent, is—

1. In a mowing machine, a carrying frame consisting of a single cross bar which has a portion thereof extending rearwardly and outwardly to serve as a pivotal axis for the cutter-supporting bar, substantially as described.

2. The combination of a shaft, a bar pivotally supported thereon, and a lever connected to said bar through the medium of a spring having lateral flexure, substantially as described.

3. In a mowing machine, the combination with a cutter supporting bar trunnioned upon the machine, of a lifting lever directly attached to the said cutter supporting bar through the agency of a spring having lateral flexure, and means for retaining the position of the lever so as to counter-balance the said cutter supporting bar by means of said spring.

4. In a mowing machine, the combination with a cutter supporting bar trunnioned upon the machine, of a lifting lever attached thereto by means of a coiled spring projected in the axis of the lever, having universal lateral flexure, substantially as described.

5. In a mowing machine, a carrying frame composed of a single cross-bar, having one end turned backward for the attachment of a cutter-supporting bar, bearing at the other end the traction wheel of the machine, and a suitable draft device attached to the said bar, substantially as described.

6. In a mowing machine, the combination of a traction wheel, a cutter, a universally jointed and longitudinally movable rotary shaft having direct connection with a cutter, gearing for transmitting motion from the traction wheel to the said rotary shaft, and a clutch for establishing or interrupting the transmission of the gearing by the longitudinal position of said shaft.

7. In a mowing machine, the combination of a traction wheel, transmitting gearing, a clutch, a cutter, a rotary shaft for driving the cutter; said shaft being longitudinally movable and connected to the clutch for determining its engagement or disengagement by the longitudinal position of said shaft; and a cutter supporting bar trunnioned to the machine and so connected to the shaft as to determine its longitudinal position according to the elevated or lowered position of the cutter supporting bar.

8. In a mowing machine, the combination of a traction wheel, transmitting gearing, a normally engaged spring clutch, a rotary-cutter, a trunnioned cutter supporting bar, and a longitudinally movable rotary shaft for transmitting rotation from the gearing to the cutter, having its longitudinal position determined by the position of the cutter supporting bar, so as to open the clutch when the cutter supporting bar is raised, substantially as and for the purposes described.

9. In a mowing machine, the combination of a traction wheel, a cutter and transmitting gearing, consisting of a stationary circular rack, a series of planet gears engaging therewith connected at their axes with the traction wheel, a central pinion, a rotary frame connected thereto bearing a second series of planet gears, a second stationary circular rack for engagement thereof, and a second central pinion, and means for operating the cutter by the rotation of said second pinion.

10. In a mowing machine, the combination of a carrying frame, a cutter operatively connected with the driving mechanism, by means of a rotary shaft and a clutch, and a cutter-supporting bar trunnioned to the said frame and arranged to make or break said operative clutch connection by vibration on its axis and a longitudinal movement of said rotary shaft, substantially as described.

11. In a mowing machine, the combination of a traction wheel, a cutter, a pinion, a circular rack, planet gears for driving said pinion, engaging with said rack and arranged to be driven by the rotation of said traction wheel, a rotary frame connected to said pinion, gearing on said frame, a second circular rack for engagement therewith, a second pinion, and means for operating the cutter by the rotation of said second pinion, substantially as described.

12. In a mowing machine, the combination of a hollow hub, planet gears pivoted within said hub, a circular rack, a sliding pinion rotated by said gears, a rotating frame detachably connected to said pinion and carrying planet gears, a second circular rack, a sliding pinion rotated by the latter, and a spring for detaching said frame from said pinion, and breaking the operative connection therewith, substantially as described.

GERARD BEEKMAN.

Witnesses:
EUGENE LUCAS,
H. F. PARKER.